(12) United States Patent
Fattal et al.

(10) Patent No.: US 12,313,872 B2
(45) Date of Patent: May 27, 2025

(54) STATIC-IMAGE AUGMENTED PRIVACY DISPLAY, MODE-SWITCHABLE PRIVACY DISPLAY SYSTEM, AND METHOD

(71) Applicant: LEIA INC., Menlo Park, CA (US)

(72) Inventors: David A. Fattal, Menlo Park, CA (US); Thomas Hoekman, Redwood City, CA (US)

(73) Assignee: LEIA Inc., Menlo Park, CA (US)

( * ) Notice: Subject to any disclaimer, the term of this patent is extended or adjusted under 35 U.S.C. 154(b) by 321 days.

(21) Appl. No.: 17/895,944

(22) Filed: Aug. 25, 2022

(65) Prior Publication Data

US 2022/0413203 A1 Dec. 29, 2022

Related U.S. Application Data

(63) Continuation of application No. PCT/US2021/020163, filed on Feb. 28, 2021.
(Continued)

(51) Int. Cl.
*G02B 27/30* (2006.01)
*F21V 8/00* (2006.01)

(52) U.S. Cl.
CPC .......... *G02B 6/0016* (2013.01); *G02B 6/0018* (2013.01); *G02B 6/005* (2013.01); *G02B 27/30* (2013.01)

(58) Field of Classification Search
CPC ...... G02B 6/00; G02B 6/0016; G02B 6/0018; G02B 6/0076; G02B 6/0036;
(Continued)

(56) References Cited

U.S. PATENT DOCUMENTS 9,128,226 B2 9/2015 Fattal et al.
9,201,270 B2 12/2015 Fattal et al.
(Continued)

FOREIGN PATENT DOCUMENTS

CA 3089955 9/2019
CA 3170343 9/2021
(Continued)

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.
(Continued)

*Primary Examiner* — Jie Lei
(74) *Attorney, Agent, or Firm* — Schwegman, Lundberg & Woessner, P.A.

(57) ABSTRACT

A static-image augmented privacy display, mode-switchable privacy display system, and method provide a private image to a first view zone and a static image to a second view zone. The static-image augmented privacy display includes a privacy backlight configured to provide directional emitted light to the first view zone and an array of light valves configured to modulate the directional emitted light to provide a private image within the first view zone. The static-image augmented privacy display also includes a static display layer configured to provide a static image in a second view zone. The mode-switchable privacy display includes a broad-angle backlight configured to provide broad-angle emitted light to both a first view zone and a second view zone during a shared mode, a shared image being provided by modulation of the broad-angle emitted light using the light valve array.

25 Claims, 8 Drawing Sheets

Related U.S. Application Data

(60) Provisional application No. 62/983,918, filed on Mar. 2, 2020.

(58) Field of Classification Search
CPC .. G02B 6/0035; G02B 6/0038; G02B 6/0058; G02B 6/005; G02B 6/12; G02B 5/18; G02B 5/1842; G02B 5/1861; G02B 5/1866; G02B 27/30; G02B 27/22; G02B 27/2214; G02B 27/0172; G02F 1/1336; G02F 1/133602; G02F 1/133626; G02F 1/133615
USPC .... 359/613, 563, 566, 567, 569; 349/15, 61, 349/65, 142
See application file for complete search history.

(56) References Cited

U.S. PATENT DOCUMENTS

| | | |
|---|---|---|
| 9,298,168 B2 | 3/2016 | Taff et al. |
| 9,389,415 B2 | 7/2016 | Fattal et al. |
| 9,459,461 B2 | 10/2016 | Santori et al. |
| 9,557,466 B2 | 1/2017 | Fattal |
| 9,785,119 B2 | 10/2017 | Taff et al. |
| 10,345,505 B2 | 7/2019 | Fattal |
| 10,649,128 B2 | 5/2020 | Fattal et al. |
| 10,705,281 B2 | 7/2020 | Fattal et al. |
| 10,830,939 B2 | 11/2020 | Fattal et al. |
| 10,928,564 B2 | 2/2021 | Fattal |
| 10,928,677 B2 | 2/2021 | Aieta et al. |
| 10,969,627 B2 | 4/2021 | Fattal et al. |
| 11,200,855 B2 | 12/2021 | Fattal |
| 11,307,344 B2 | 4/2022 | Fattal et al. |
| 11,347,053 B2 | 5/2022 | Fattal |
| 11,360,259 B2 | 6/2022 | Li et al. |
| 2007/0008456 A1 | 1/2007 | Lesage et al. |
| 2007/0197288 A1 | 8/2007 | Fujimoto et al. |
| 2009/0322986 A1 | 12/2009 | Wei et al. |
| 2013/0169518 A1 | 7/2013 | Wu et al. |
| 2016/0282542 A1 | 9/2016 | Seo et al. |
| 2017/0363794 A1 | 12/2017 | Wan et al. |
| 2018/0156963 A1 | 6/2018 | Fattal |
| 2018/0188439 A1 | 7/2018 | Kim et al. |
| 2019/0018186 A1 | 1/2019 | Fattal |
| 2019/0250458 A1 | 8/2019 | Robinson et al. |
| 2019/0317265 A1 | 10/2019 | Fattal et al. |
| 2019/0353943 A1 | 11/2019 | Smith et al. |
| 2020/0005718 A1 | 1/2020 | Fattal |
| 2020/0018891 A1 | 1/2020 | Fattal et al. |
| 2020/0033619 A1 | 1/2020 | Fattal et al. |
| 2020/0217996 A1 | 7/2020 | Fattal |
| 2021/0294017 A1 | 9/2021 | Fattal |
| 2021/0302630 A1 | 9/2021 | Fattal |
| 2021/0390914 A1 | 12/2021 | Fattal |
| 2021/0407438 A1 | 12/2021 | Fattal |
| 2022/0026732 A1 | 1/2022 | Fattal |
| 2022/0146733 A1 | 5/2022 | Fattal et al. |
| 2022/0196902 A1 | 6/2022 | Fattal et al. |
| 2022/0244447 A1 | 8/2022 | Fattal et al. |
| 2022/0244449 A1 | 8/2022 | Fattal et al. |

FOREIGN PATENT DOCUMENTS

| | | |
|---|---|---|
| CN | 104272170 | 1/2015 |
| CN | 104460115 | 3/2015 |
| CN | 106443867 | 2/2017 |
| CN | 107195248 | 9/2017 |
| CN | 108139589 | 6/2018 |
| CN | 110462285 | 11/2019 |
| CN | 110520671 | 11/2019 |
| CN | 115210634 | 6/2024 |
| EP | 4115235 | 1/2023 |
| JP | 2007222327 | 9/2007 |
| JP | 2023519663 | 5/2023 |
| JP | 7427104 | 1/2024 |
| KR | 20160085887 | 7/2016 |
| KR | 20190104446 | 9/2019 |
| KR | 20220130779 | 9/2022 |
| TW | 201930985 | 8/2019 |
| TW | 201932927 | 8/2019 |
| TW | 202201100 | 1/2022 |
| TW | 1761098 | 4/2022 |
| WO | 2004036286 | 4/2004 |
| WO | 2007140345 | 12/2007 |
| WO | 2012038856 A1 | 3/2012 |
| WO | 2016056345 | 4/2016 |
| WO | 2017041079 | 3/2017 |
| WO | 2018182991 | 10/2018 |
| WO | 2018186906 | 10/2018 |
| WO | 2018187019 | 10/2018 |
| WO | 2020005293 | 1/2020 |
| WO | 2021150462 A1 | 7/2021 |
| WO | 2021150658 A1 | 7/2021 |
| WO | 2021151009 A1 | 7/2021 |
| WO | 2021178256 A1 | 9/2021 |
| WO | 2021178258 | 9/2021 |

OTHER PUBLICATIONS

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al., "Holographic 3-D Displays—Electro-holography within the Grasp of Commercialization," Advances In Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

International Search Report and Written Opinion (ISRWO) from the International Searching Authority (ISA/KR) dated Jun. 17, 2021 (9 pages) for counterpart parent PCT Application No. PCT/US2021/020163.

"Chinese Application Serial No. 202180018657.9, Office Action mailed Oct. 11, 2023", W English Translation, 13 pgs.

"European Application Serial No. 21764860.9, Response filed Aug. 2, 2024 to Extended European Search Report mailed Feb. 22, 2024", 10 pgs.

"Korean Application Serial No. 10-2022-7029262, Notice of Preliminary Rejection mailed Jan. 29, 2024", w English Translation, 11 pgs.

"International Application Serial No. PCT US2021 020163, International Preliminary Report on Patentability mailed Sep. 15, 2022", 6 pgs.

"European Application Serial No. 21764860.9, Extended European Search Report mailed Feb. 22, 2024", 12 pgs.

"Chinese Application Serial No. 202180018657.9, Response to Examiner Telephone Interview Filed Apr. 10, 2024", w English Claims, 37 pgs.

"European Application Serial No. 21764860.9, Response filed Mar. 24, 2023 to Communication pursuant to Rules 161(2) and 162 EPC mailed Oct. 11, 2022", 34 pgs.

"Canadian Application Serial No. 3,170,343, Voluntary Amendment filed Aug. 8, 2022", 40 pgs.

"Canadian Application Serial No. 3,170,343, Office Action mailed Sep. 11, 2023", 3 pgs.

"Canadian Application Serial No. 3,170,343, Response filed Jan. 3, 2024 to Office Action mailed Sep. 11, 2023", 4 pgs.

(56) References Cited

OTHER PUBLICATIONS

"Taiwanese Application Serial No. 110107326, Office Action mailed Jan. 17, 2022", w English translation, 5 pgs.
"Korean Application Serial No. 10-2022-7029262, Response filed May 14, 2024 to Notice of Preliminary Rejection mailed Jan. 29, 2024", w current English claims, 22 pgs.

STATIC-IMAGE AUGMENTED PRIVACY DISPLAY, MODE-SWITCHABLE PRIVACY DISPLAY SYSTEM, AND METHOD

CROSS-REFERENCE TO RELATED APPLICATIONS

This application is a continuation patent application of and claims priority to International Application No. PCT/US2021/020163, filed Feb. 28, 2021, which claims the benefit of priority to U.S. Provisional Patent Application Ser. No. 62/983,918, filed Mar. 2, 2020, the entirety of both of which is incorporated by reference herein.

STATEMENT REGARDING FEDERALLY SPONSORED RESEARCH OR DEVELOPMENT

N/A

BACKGROUND

Displays and more particularly 'electronic' displays are a nearly ubiquitous medium for communicating information to users of a wide variety of devices and products. For example, electronic displays may be found in various devices and applications including, but not limited to, mobile telephones (e.g., smart phones), watches, tablet computes, mobile computers (e.g., laptop computers), personal computers and computer monitors, automobile display consoles, camera displays, and various other mobile as well as substantially non-mobile display applications and devices. Electronic displays generally employ a differential pattern of pixel intensity to represent or display an image or similar information that is being communicated. The differential pixel intensity pattern may be provided by reflecting light incident on the display as in the case of passive electronic displays. Alternatively, the electronic display may provide or emit light to provide the differential pixel intensity pattern. Electronic displays that emit light are often referred to as active displays.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
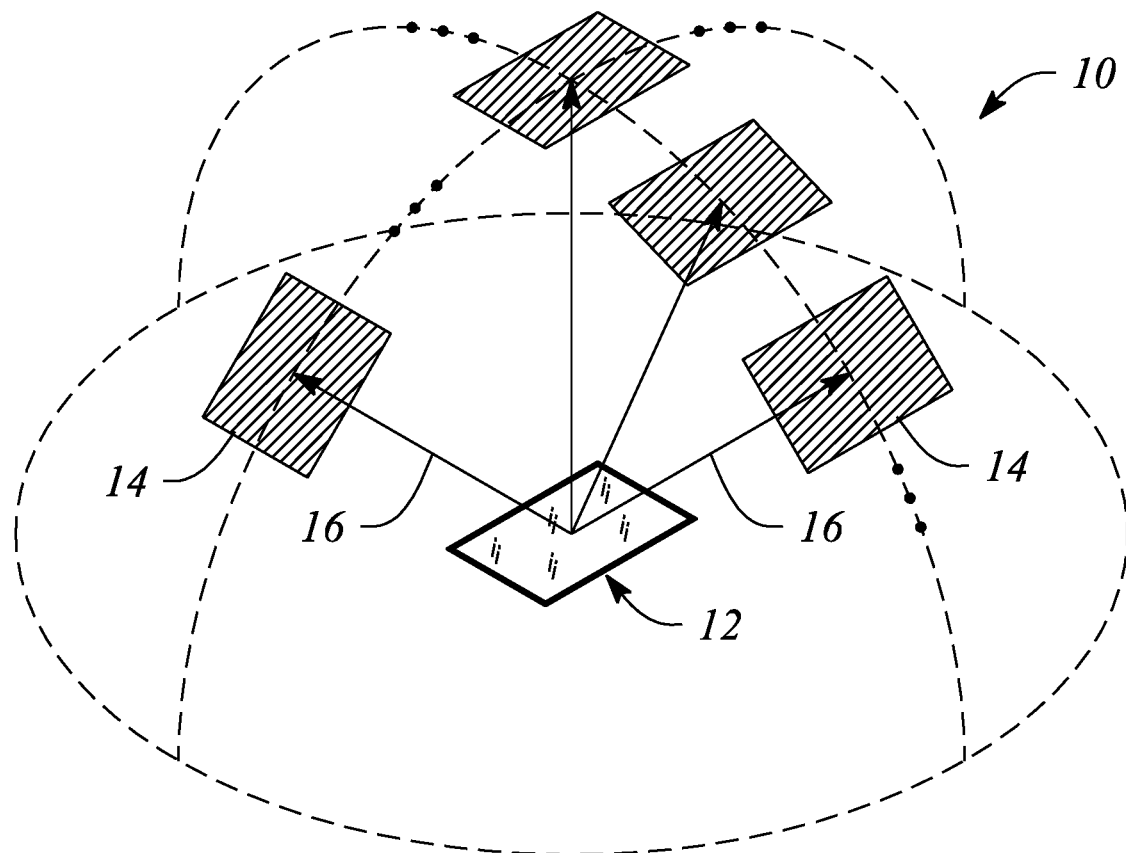
FIG. 1A illustrates a perspective view of a multiview display in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a privacy display augmented with a static image. In particular, embodiments consistent with the principles described augmenting the privacy display by providing the static image using a plurality of directional light beams emitted from a static display layer that covers the privacy display. The individual intensities and directions of directional light beams of the directional light beam plurality, in turn, correspond to various view pixels in views of the static image being displayed. According to various embodiments, the privacy image is provided to a first view zone, while the static image is provided to a second view zone that is mutually exclusive to the first view zone. In some embodiments, one or both of the privacy image and the static image are multiview images, i.e., a private multiview image and a static multiview image. Further, according to various embodiments, privacy display may include one or more additional layers that provide one or both of privacy image and a shared image, e.g., in a respective privacy mode and a shared mode of operation.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in many smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image. Uses of unilateral backlighting and unilateral multiview displays described herein include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

Herein, a 'multiview display' is defined as an electronic display or display system configured to provide different views of a multiview image in different view directions. A 'static multiview display' is a defined as a multiview display configured to display a predetermined or fixed (i.e., static) multiview image, albeit as a plurality of different views. A 'quasi-static multiview display' is defined herein as a static multiview display that may be switched between different fixed multiview images or between a plurality of multiview image states, typically as a function of time. Switching between the different fixed multiview images or multiview image states may provide a rudimentary form of animation, for example. Further, as defined herein, a quasi-static multiview display is a type of static multiview display. As such, no distinction is made between a purely static multiview display or image and a quasi-static multiview display or image, unless such distinction is necessary for proper understanding.

FIG. 1A illustrates a perspective view of a multiview display 10 in an example, according to an embodiment consistent with the principles described herein. As illustrated in FIG. 1A, the multiview display 10 comprises a diffraction grating on a screen 12 configured to display a view pixel in a view 14 within or of a multiview image 16 (or equivalently a view 14 of the multiview display 10). The screen 12 may be a display screen of an automobile, a telephone (e.g., mobile telephone, smart phone, etc.), a tablet computer, a laptop computer, a computer monitor of a desktop computer, a camera display, or an electronic display of substantially any other device, for example.

The multiview display 10 provides different views 14 of the multiview image 16 in different view directions 18 (i.e., in different principal angular directions) relative to the screen 12. The view directions 18 are illustrated as arrows extending from the screen 12 in various different principal angular directions. The different views 14 are illustrated as shaded polygonal boxes at the termination of the arrows (i.e., depicting the view directions 18). Thus, when the multiview display 10 (e.g., as illustrated in FIG. 1A) is rotated about the y-axis, a viewer sees different views 14. On the other hand (as illustrated) when the multiview display 10 in FIG. 1A is rotated about the x-axis the viewed image is unchanged until no light reaches the viewer's eyes (as illustrated).

Note that, while the different views 14 are illustrated as being above the screen 12, the views 14 actually appear on or in a vicinity of the screen 12 when the multiview image 16 is displayed on the multiview display 10 and viewed by the viewer. Depicting the views 14 of the multiview image 16 above the screen 12 as in FIG. 1A is done only for simplicity of illustration and is meant to represent viewing the multiview display 10 from a respective one of the view directions 18 corresponding to a particular view 14. Further, in FIG. 1A only three views 14 and three view directions 18 are illustrated, all by way of example and not limitation.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane).

Figure 1B:
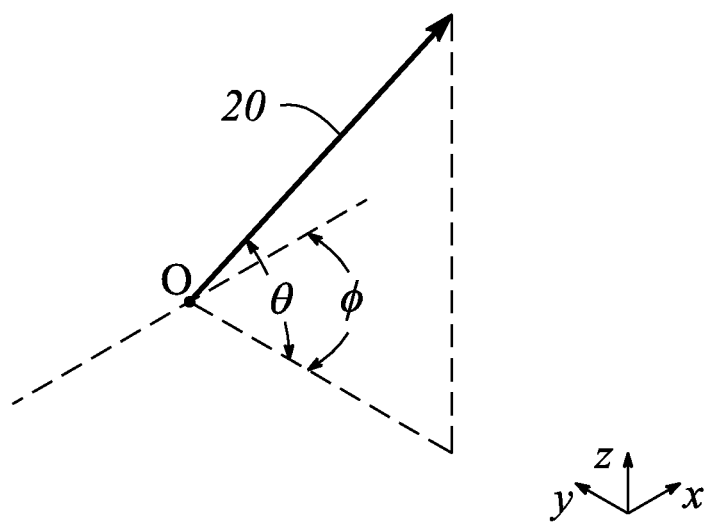
FIG. 1B illustrates a graphical representation of angular components of a light beam having a particular principal angular direction corresponding to a view direction of a multiview display in an example, according to an embodiment consistent with the principles described herein.

FIG. 1B illustrates a graphical representation of the angular components $\{\theta, \phi\}$ of a light beam 20 having a particular principal angular direction corresponding to a view direction (e.g., view direction 18 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays may include more than two views, by definition herein, multiview images may be viewed (e.g., on a multiview display) as a stereoscopic pair of images by selecting only two of the multiview views to view at a time (e.g., one view per eye).

In the multiview display, a 'multiview pixel' is defined herein as a set or plurality of view pixels representing pixels in each of a similar plurality of different views of a multiview display. Equivalently, a multiview pixel may have an individual view pixel corresponding to or representing a pixel in each of the different views of the multiview image to be displayed by the multiview display. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels represented by the view pixels of a multiview pixel may have equivalent or at least substantially similar locations or coordinates in each of the different views. For example, a first multiview pixel may have individual view pixels corresponding to view pixels located at $\{x_1, y_1\}$ in each of the different views of a multiview image, while a second multiview pixel may have individual view pixels corresponding to view pixels located at $\{x_2, y_2\}$ in each of the different views, and so on.

In some embodiments, a number of view pixels in a multiview pixel may be equal to a number of views of the multiview display. For example, the multiview pixel may provide eight (8) view pixels associated with a multiview display having 8 different views. Alternatively, the multiview pixel may provide sixty-four (64) view pixels associated with a multiview display having 64 different views. In another example, the multiview display may provide an eight by four array of views (i.e., 32 views) and the multiview pixel may include thirty-two 32 view pixels (i.e., one for each view). Further, according to some embodiments, a number of multiview pixels of the multiview display may be substantially equal to a number of pixels that make up a selected view of the multiview display.

Herein, a 'light guide' is defined as a structure that guides light within the structure using total internal reflection or 'TIR'. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner having one or more grating spacings between pairs of the features. For example, the diffraction grating may comprise a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example. According to various embodiments and examples, the diffraction grating may be a sub-wavelength grating having a grating spacing or distance between adjacent diffractive features that is less than about a wavelength of light that is to be diffracted by the diffraction grating.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure comprising diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross-sectional shapes or profiles that provide diffraction including, but not limited to, one or more of a sinusoidal profile, a rectangular profile (e.g., a binary diffraction grating), a triangular profile and a saw tooth profile (e.g., a blazed grating).

As described further below, a diffraction grating herein may have a grating characteristic, including one or more of a feature spacing or pitch, an orientation and a size (such as a width or length of the diffraction grating). Further, the grating characteristic may selected or chosen to be a function of the angle of incidence of light beams on the diffraction grating, a distance of the diffraction grating from a light source or both. In particular, the grating characteristic of a diffraction grating may be chosen to depend on a relative location of the light source and a location of the diffraction grating, according to some embodiments. By appropriately varying the grating characteristic of the diffraction grating, both an intensity and a principal angular direction of a light beam diffracted (e.g., diffractively coupled-out of a light guide) by the diffraction grating (i.e., a 'directional light beam') corresponds to an intensity and a view direction of a view pixel of the multiview image.

According to various examples described herein, a diffraction grating (e.g., a diffraction grating of a multiview pixel, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n \sin\theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
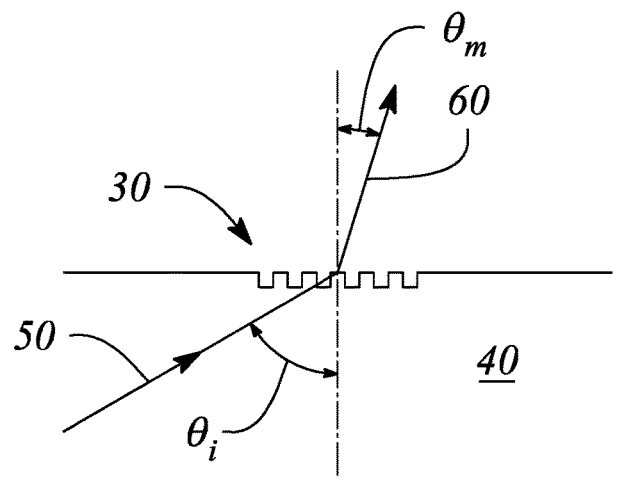
FIG. 2 illustrates a cross-sectional view of a diffraction grating in an example, according to an embodiment consistent with the principles described herein.

FIG. 2 illustrates a cross-sectional view of a diffraction grating 30 in an example, according to an embodiment consistent with the principles described herein. For example, the diffraction grating 30 may be located on a surface of a light guide 40. In addition, FIG. 2 illustrates a light beam (or a collection of light beams) 50 incident on the diffraction grating 30 at an incident angle $\theta_i$. The light beam 50 is a guided light beam within the light guide 40. Also illustrated in FIG. 2 is a coupled-out light beam (or a collection of light beams) 60 diffractively produced and coupled-out by the diffraction grating 30 as a result of diffraction of the incident light beam 20. The coupled-out light beam 60 has a diffraction angle $\theta_m$ (or 'principal angular direction' herein) as given by equation (1). The coupled-out light beam 60 may correspond to a diffraction order 'm' of the diffraction grating 30, for example.

By definition herein, a 'multibeam element' is a structure or element of a backlight or a display that produces light that includes a plurality of light beams. In some embodiments, the multibeam element may be optically coupled to a light guide of a backlight to provide the plurality of light beams by coupling or scattering out a portion of light guided in the light guide. Further, the light beams of the plurality of light beams produced by a multibeam element have different principal angular directions from one another, by definition herein. In particular, by definition, a light beam of the plurality has a predetermined principal angular direction that is different from another light beam of the light beam plurality. As such, the light beam is referred to as a 'directional light beam' and the light beam plurality may be termed a 'directional light beam plurality,' by definition herein.

Furthermore, the directional light beam plurality may represent a light field. For example, the directional light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field.

According to various embodiments, the different principal angular directions of the various directional light beams of the plurality are determined by a characteristic including, but not limited to, a size (e.g., length, width, area, etc.) of the multibeam element. In some embodiments, the multibeam element may be considered an 'extended point light source', i.e., a plurality of point light sources distributed across an extent of the multibeam element, by definition herein. Further, a directional light beam produced by the multibeam element has a principal angular direction given by angular components $\{\theta, \phi\}$, by definition herein, and described above with respect to FIG. 1B.

Herein, a 'collimated light' or 'collimated light beam' is generally defined as a beam of light in which rays of the light beam are substantially parallel to one another within the light guide (e.g., the guided light beam in the light guide). Further, rays of light that diverge or are scattered from the collimated light beam are not considered to be part of the collimated light beam, by definition herein. Moreover, herein a 'collimator' is defined as substantially any optical device or apparatus that is configured to collimate light.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., +/−$\sigma$ degrees about a central or principal angular direction of the collimated light beam). The light rays of the collimated light beam may have a Gaussian distribution in terms of angle and the angular spread be an angle determined by at one-half of a peak intensity of the collimated light beam, according to some examples.

Herein a 'collimator' is defined as substantially any optical device or apparatus that is configured to collimate light. For example, a collimator may include, but is not limited to, a collimating mirror or reflector, a collimating lens, a diffraction grating, a tapered light guide, and various combinations thereof. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape or similar collimating characteristic in one or both of two orthogonal directions that provides light collimation, according to some embodiments.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., +/−$\sigma$ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example. A 'polarized' light source is defined herein as substantially any light source that produces or provides light having a predetermined polarization. For example, the polarized light source may comprise a polarizer at an output of an optical emitter of the light source.

Herein, a 'multiview image' is defined as a plurality of images (i.e., greater than three images) wherein each image of the plurality represents a different view corresponding to a different view direction of the multiview image. As such, the multiview image is a collection of images (e.g., two-dimensional images) which, when display on a multiview display, may facilitate a perception of depth and thus appear to be an image of a 3D scene to a viewer, for example.

By definition, 'broad-angle' emitted light is defined as light having a cone angle that is greater than a cone angle of the view of a multiview image or multiview display. In particular, in some embodiments, the broad-angle emitted light may have a cone angle that is greater than about twenty degrees (e.g., $>\pm 20°$). In other embodiments, the broad-angle emitted light cone angle may be greater than about thirty degrees (e.g., $>\pm 30°$), or greater than about forty degrees (e.g., $>\pm 40°$), or greater than about fifty degrees (e.g., $>\pm 50°$). For example, the cone angle of the broad-angle emitted light may be greater than about sixty degrees (e.g., $>\pm 60°$).

In some embodiments, the broad-angle emitted light cone angle may defined to be about the same as a viewing angle of an LCD computer monitor, an LCD tablet, an LCD television, or a similar digital display device meant for broad-angle viewing (e.g., about $\pm 40$-$65°$). In other embodiments, broad-angle emitted light may also be characterized or described as diffuse light, substantially diffuse light, non-directional light (i.e., lacking any specific or defined directionality), or as light having a single or substantially uniform direction.

Embodiments consistent with the principles described herein may be implemented using a variety of devices and circuits including, but not limited to, one or more of integrated circuits (ICs), very large scale integrated (VLSI) circuits, application specific integrated circuits (ASIC), field programmable gate arrays (FPGAs), digital signal processors (DSPs), graphical processor unit (GPU), and the like, firmware, software (such as a program module or a set of instructions), and a combination of two or more of the above. For example, an embodiment or elements thereof may be implemented as circuit elements within an ASIC or a VLSI circuit. Implementations that employ an ASIC or a VLSI circuit are examples of hardware-based circuit implementations.

In another example, an embodiment may be implemented as software using a computer programming language (e.g., C/C++) that is executed in an operating environment or a software-based modeling environment (e.g., MATLAB®, MathWorks, Inc., Natick, MA) that is further executed by a computer (e.g., stored in memory and executed by a processor or a graphics processor of a general purpose computer). Note that one or more computer programs or software may constitute a computer-program mechanism, and the programming language may be compiled or interpreted, e.g., configurable or configured (which may be used interchangeably in this discussion), to be executed by a processor or a graphics processor of a computer.

In yet another example, a block, a module or an element of an apparatus, device or system (e.g., image processor, camera, etc.) described herein may be implemented using actual or physical circuitry (e.g., as an IC or an ASIC), while another block, module or element may be implemented in software or firmware. In particular, according to the definitions herein, some embodiments may be implemented using a substantially hardware-based circuit approach or device (e.g., ICs, VLSI, ASIC, FPGA, DSP, firmware, etc.), while other embodiments may also be implemented as software or firmware using a computer processor or a graphics processor to execute the software, or as a combination of software or firmware and hardware-based circuitry, for example.

Further, as used herein, the article 'a' is intended to have its ordinary meaning in the patent arts, namely 'one or more'. For example, 'a multibeam element' means one or more multibeam elements and as such, 'the multibeam element' means 'the multibeam element(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
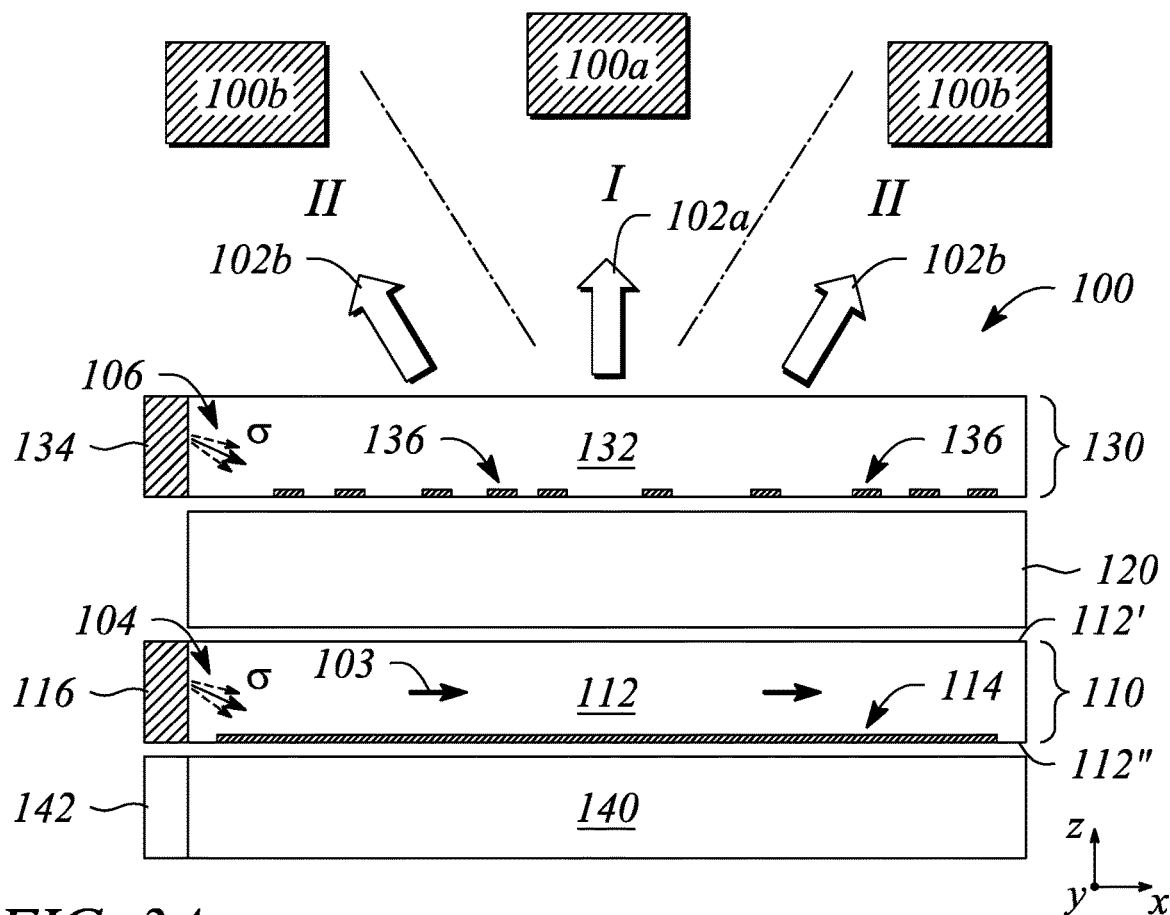
FIG. 3A illustrates a cross-sectional view of a static-image augmented privacy display in an example, according to an embodiment consistent with the principles described herein.
Figure 3B:
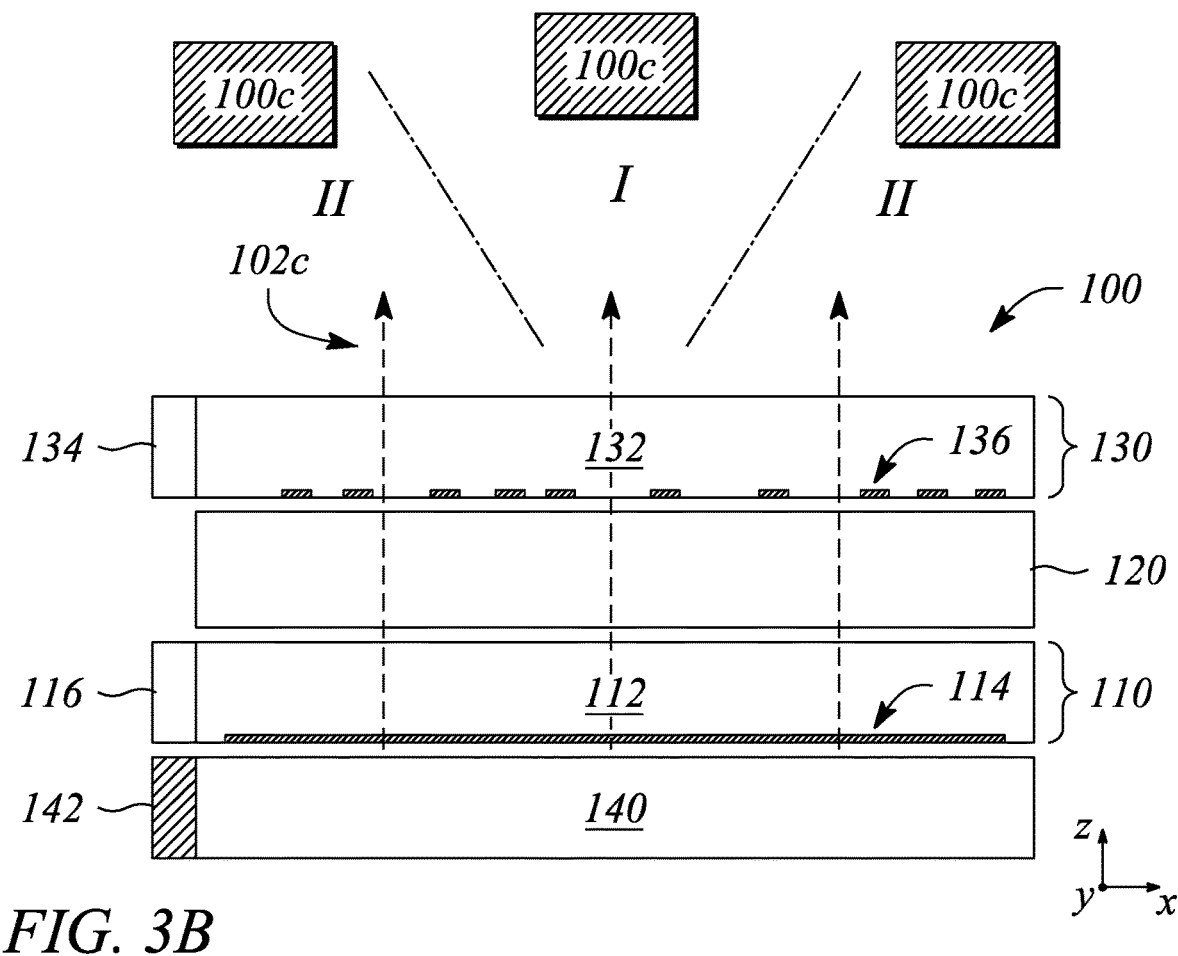
FIG. 3B illustrates a cross-sectional view of the static-image augmented privacy display of FIG. 3A in another example, according to an embodiment consistent with the principles described herein.

According to some embodiments of the principles described herein, a static-image augmented privacy display configured to provide both a private image and a static image to different view zones is provided. FIG. 3A illustrates a cross-sectional view of a static-image augmented privacy display 100 in an example, according to an embodiment consistent with the principles described herein. FIG. 3B illustrates a cross-sectional view of the static-image augmented privacy display 100 of FIG. 3A in another example, according to an embodiment consistent with the principles described herein. According to various embodiments, the static-image augmented privacy display 100 is configured to provide a private image 100a to a first view zone I. Herein, the first view zone I may also be referred to as a private view zone. Further, the static-image augmented privacy display 100 illustrated in FIGS. 3A-3B is configured to provide a static image 100b to a second view zone II, according to various embodiments. As illustrated, the first view zone I and the second view zones II mutually exclusive to one another. That is, an angular range of the first view zone I does not overlap or intersect an angular range of the second view zones II, by definition herein. As a result, the private image 100a provided by the static-image augmented privacy display 100 is configured to be visible to or viewable by a user exclusively in the first view zone I and the static image 100b is configured to be visible to or viewable by the user exclusively in the second view zone II. According to some embodiments, the private image 100a may be a multiview image, i.e., a private multiview image. Similarly, the static image 100b may be a static multiview image, according to some embodiments.

As illustrated, the static-image augmented privacy display 100 comprises a privacy backlight 110. The privacy backlight 110 is configured to provide directional emitted light 102a to the first view zone I. In particular, an angular range of the directional emitted light 102a is confined to an angular range of the first view zone I, according to various embodiments.

In some embodiments, the privacy backlight 110 may comprise a light guide 112. The light guide 112 may be a plate light guide (as illustrated), for example. According to various embodiments, the light guide 112 is configured to guide light as guided light 104. In some embodiments, the guided light 104 within the light guide 112 may have or be guided according to a non-zero propagation angle. Further, the guided light 104 may be guided according to or may have a predetermined collimation factor σ. One or both of the non-zero propagation angle and the predetermined collimation factor σ may be selected to control or determine either or both of a direction and an angular spread of the directional emitted light 102a, according to some embodiments.

The light guide 112 is configured to guide light along a length of the light guide 112 as guided light 104. For example, the light guide 112 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 (or guided light beams) according to one or more guided modes of the light guide 112, for example.

In some embodiments, the light guide 112 may be a slab or plate optical waveguide comprising an extended, substantially planar sheet of optically transparent, dielectric material. The substantially planar sheet of dielectric material is configured to guide the guided light 104 using total internal reflection (TIR). According to various examples, the optically transparent material of the light guide 112 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 112 may further include a cladding layer (not illustrated) on at least a portion of a surface (e.g., one or both of the top surface and the bottom surface) of the light guide 112. The cladding layer may be used to further facilitate total internal reflection, according to some examples.

According to various embodiments, the light guide 112 is configured to guide the guided light 104 according to total internal reflection at a non-zero propagation angle between a first surface 112' (e.g., a 'front' surface) and a second surface 112" (e.g., a 'back' or 'bottom' surface) of the light guide 112. In particular, the guided light 104 propagates (e.g., as guided light beams) by reflecting or 'bouncing' between the first surface 112' and the second surface 112" of the light guide 112 at the non-zero propagation angle. As such, the first and second surfaces 112', 112" may also be referred to as 'guiding surfaces' of the light guide 112. Note, the non-zero propagation angle is not explicitly depicted in FIG. 3A for simplicity of illustration. However, FIG. 3A does illustrate an arrow pointing into a plane of the illustration depicting a general propagation direction 103 of the guided light 104 along the light guide length.

As defined herein, a 'non-zero propagation angle' is an angle relative to a surface (e.g., the first surface 112' or the second surface 112") of the light guide 112. Further, the non-zero propagation angle is both greater than zero and less than a critical angle of total internal reflection within the light guide 112, according to various embodiments. For example, the non-zero propagation angle of the guided light 104 may be between about ten degrees (10°) and about fifty degrees (50°) or, in some examples, between about twenty degrees (20°) and about forty degrees (40°), or between about twenty-five degrees (25°) and about thirty-five degrees (35°). For example, the non-zero propagation angle may be about thirty degrees (30°). Moreover, a specific non-zero propagation angle may be chosen (e.g., arbitrarily) for a particular implementation as long as the specific non-zero propagation angle is chosen to be less than the critical angle of total internal reflection within the light guide 112.

As illustrated in FIGS. 3A-3B, the privacy backlight 110 further comprises a directional scattering feature 114. The directional scattering feature 114 is configured to scatter guided light out of the light guide as the directional emitted light 102a. In particular, the directional scattering feature 114 is configured to scatter out the guided light having an angular extent corresponding to the angular range or extent of the first view zone I. According to various embodiments, directional scattering feature 114 may comprise one or more of a diffraction grating, an reflective scattering element, and a refractive scattering element. In some embodiments (e.g., as illustrated in FIGS. 3A-3B), the directional scattering feature 114 may be disposed adjacent to, on, or even in a guiding surface of the light guide 112 (e.g., the first or second surfaces 112', 112"). For example, FIGS. 3A-3B illustrate the directional scattering feature 114 adjacent to the second surface 112" of the light guide 112. In other embodiments (not illustrated), the directional scattering feature 114 may be located between and spaced apart from guiding surfaces of the light guide 112. In yet other embodiments, the directional scattering feature 114 may be distributed both adjacent to (e.g., on or at) a guiding surface and between the guiding surfaces.

The static-image augmented privacy display 100 illustrated in FIGS. 3A-3B further comprises an array of light valves 120. The array of light valves 120 or light valve array is configured to modulate the directional emitted light 102a to provide the private image 100a within the first view zone I. In particular, the private image 100a provided by the modulation is confined to and therefore visible in the first view zone I due to or as a result of the angular range or extent of the directional emitted light 102a emitted by the privacy backlight 110. In various embodiments, different types of light valves may be employed as the light valves 120 of the light valve array including, but not limited to, one or more of liquid crystal light valves, electrophoretic light valves, and light valves based on electrowetting.

In some embodiments, the directional scattering feature 114 may comprise an array of multibeam elements spaced apart from one another across the light guide 112. The multibeam elements of the multibeam element array may be one or both of adjacent to a guiding surface and between opposing guiding surfaces of the light guide 112, for example. According to various embodiments, each multibeam element of the multibeam element array is configured to scatter out a portion of the guided light as the directional emitted light 102a comprising directional light beams having directions corresponding to different view directions of a multiview image within the first view zone I. In these embodiments, the private image 100a is the multiview image, different views in different view directions of which are confined to and may be visible exclusively within the first view zone I. Further, a combination of the privacy backlight 110 and the array of light valves 120 may be referred to as a multiview display, in these embodiments.

According to various embodiments and as illustrated in FIGS. 3A-3B, the static-image augmented privacy display 100 further comprises a static display layer 130. The static display layer 130 is configured to provide the static image 100b in the second view zone II. As illustrated, the static display layer 130 is disposed adjacent to and separated from an emission surface of the light valve array. By definition, the emission surface of the light valve array is a surface from which the directional emitted light 102a, having been modulated by the light valve array to represent the private image 100a, is emitted and directed toward the first view zone I. According to various embodiments, the static display layer 130 is transparent or substantially transparent to light (i.e., the modulated, directional emitted light 102a) representing the private image 100a. In particular, the modulated, directional emitted light 102a exiting the light valve array is configured to pass through the static display layer 130 to provide the private image 100a in the first view zone I, according to various embodiments.

As mentioned above, the static image 100b provided by the static display layer 130 is configured to be visible exclusively in the second view zone II. As such, light beams emitted as static directional emitted light 102b by the static display layer 130 and representing pixels of the static image 100b are selectively directed into the second view zone II by the static display layer 130. Moreover, the static display layer 130 is configured to exclude directing emitted light into the first view zone I, according to various embodiments.

In some embodiments (e.g., as illustrated), the static display layer 130 comprises a light guide 132 and a light source 134. The light guide 132 is configured to guide light from or provided by the light source 134 as guided light 106 within the light guide 132. The light guide 132 may be a plate light guide (e.g., as illustrated), for example. According to some embodiments, the light guide 132 may be substantially similar to the light guide 112, described above. For example, the light guide 132 may comprise an sheet or layer of optically transparent material configured to guide light by or according to total internal reflection. The optically transparent material may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). According to various embodiments, the light source 134 is optically connected to an edge of the light guide 132 (e.g., as illustrated). The light source 134 may comprise one or more optical emitters such as, but not limited to, a light emitting diode (LED), for example.

In some embodiments, the static display layer 130 may be affixed to the emission surface of the light valve array using a 'low-index' adhesive having a refractive index that is less than a refractive index of a material of light guide 132 of the static display layer 130. For example, a gap between the light guide 132 and the emission surface may be filled with the low-index adhesive. In other embodiments, the gap may be filled with air or another low-index material having a refractive index that is less than the refractive index of the light guide 132 to facilitate and maintain total internal reflection of the guided light 106 within the light guide 132.

The static display layer 130 further comprises a plurality of directional scattering elements 136. The plurality of directional scattering element are configured to scatter the guided light 106 out of the light guide 132 as static directional emitted light 102b to provide the static image 100b within the second view zone II. In particular, the static directional emitted light 102b comprises directional light beams that represent pixels of the static image 100b. That is, a directional light beam of the static directional emitted light 102b scattered out of the light guide 132 by a directional scattering element 136 of the directional scattering element plurality has a principal angular direction and an intensity corresponding to a pixel of the static image 100b. Further, the principal angular direction of the scattered-out, light beam of the static directional emitted light 102b is confined within an angular range of the second view zone II, according to various embodiments. In combination, the various directional light beams of the static directional emitted light 102b provided by the plurality of directional scattering elements 136 and having principal angular directions and intensities create or provide pixels that make up the static image 100b. Since the static directional emitted light 102b is confined to the second view zone II, the static image 100b is exclusively visible to a user within the second view zone II.

In some embodiments, the guided light 106 comprises a plurality of guided light beams having different radial directions from one another within the light guide 132. For example, the light source 134 may comprise an LED optically coupled (e.g., butt-coupled) to an input edge of the light guide 132. The light source 134 may, therefore, act as or approximate a 'point source' of light at the light guide edge and provide the guided light beams having the different radial directions. The light source 134 being butt-coupled may facilitate introduction of light in a fan-shape pattern to provide the different radial directions of the individual guided light beams, for example. Directional scattering elements 136 of the directional scattering element plurality may be distributed across the light guide to intercept and scatter out the guided light beams having the different radial directions, according to various embodiments.

Figure 4A:
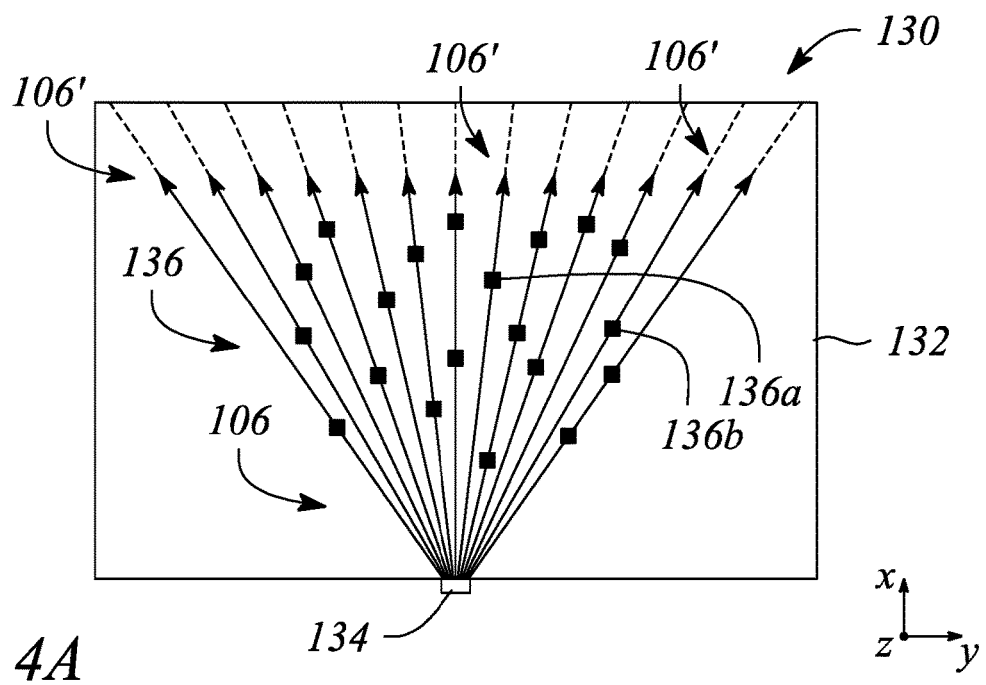
FIG. 4A illustrated a plan view of a static display layer in an example, according to an embodiment consistent with the principles described herein.
Figure 4B:
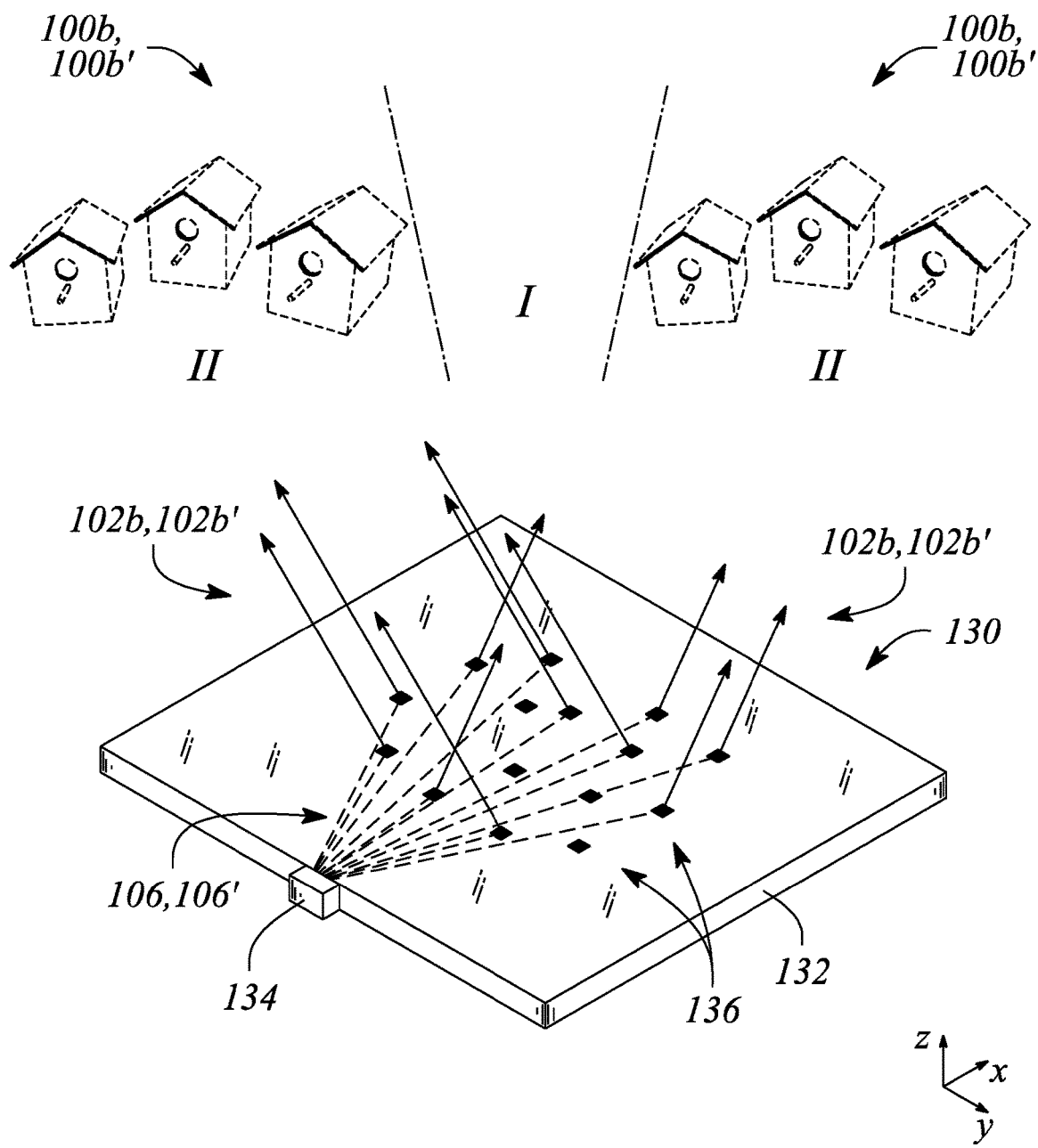
FIG. 4B illustrates a perspective view of a static display layer in an example, according to an embodiment consistent with the principles described herein.

FIG. 4A illustrated a plan view of a static display layer 130 in an example, according to an embodiment consistent with the principles described herein. FIG. 4B illustrates a perspective view of a static display layer 130 in an example, according to an embodiment consistent with the principles described herein. As illustrated, the light source 134 acting as a point source is optically coupled to the edge of the light guide 132. Further, as illustrated, light emitted by the light source 134 propagates away from the light source 134 within the light guide 132 as guided light comprising a plurality of guided light beams 106' having the different radial directions. FIG. 4A further illustrates directional scattering elements 136 distributed across the light guide 132 to intercept and scatter out portions of the guided light beams 106'. The scattered-out, guided light beams 106' provided by the directional scattering elements 136, in turn, provide individual, static directional light beams 102b' of the static directional emitted light 102b that represent pixels of the static image 100b, as illustrated in FIG. 4B. In effect, characteristics of individual directional scattering elements 136 of the directional scattering element plurality encode pixels of the static image 100b.

In some embodiments, the plurality of directional scattering elements 136 are configured to scatter out the guided light 106 as the static directional emitted light 102b to provide the static image 100b as a static multiview image 100b'. That is, sets of the static directional light beams 102b' of the static directional emitted light 102b provided by corresponding sets of the directional scattering elements 136 are directed in different directions corresponding to view directions of the static multiview image 100b'. In these embodiments, each directional scattering element 136 (e.g., different directional scattering elements 136a, 136b) of the directional scattering element plurality is configured to provide from a portion of a guided light beam 106' of the guided light beam plurality a static directional light beam 102b' having an intensity and a principal angular direction corresponding to an intensity and a view direction of a view pixel of the static multiview image 100b'. Together, the plurality of static directional light beams 102b' of the static directional emitted light 102b represents various view pixels of a set of views of the static multiview image 100b'. In some embodiments, the view pixels may be organized into multiview pixels to represent the various different views of the static multiview image 100b'.

FIG. 4B illustrates static directional light beams 102b' of the static directional emitted light 102b scattered out of the light guide 132 by the directional scattering elements 136. These scattered-out, static directional light beams 102b' represent the view pixels of the static multiview image 100b'. In particular, the static multiview image 100b' includes three different views in three different view directions within the second view zone II, as illustrated. The different views be different perspective of an object allowing a viewer to perceive the object in three-dimensions, e.g., as a three-dimensional (3D) image of the object.

According to some embodiments, a directional scattering element 136 of the directional scattering element plurality may comprises a diffraction grating. In these embodiments, a grating characteristic of the diffraction grating is configured to determine the intensity and a principal angular direction of the directional light beam emitted or scattered out by the directional scattering element 136. In some embodiments, the grating characteristic may comprise one or more of a grating depth, a grating pitch, and a grating orientation. The grating depth may be configured to determine the intensity of the directional light beam provided by the diffraction grating. Further, one or both of the grating pitch and the grating orientation may be configured to determine the principal angular direction of the directional light beam provided by the diffraction grating. In other embodiments, other scattering elements such as, but not limited to, a micro-reflective scattering element and a micro-refractive scattering element may be employed as the directional scattering element 136.

Referring again to FIGS. 3A-3B, in some embodiments, the static-image augmented privacy display 100 may further comprise a broad-angle backlight 140. The broad-angle backlight 140 is configured to provide broad-angle emitted light 102c. As illustrated, the broad-angle backlight 140 is disposed adjacent to a side of the privacy backlight 110 opposite an emission surface of the privacy backlight 110. In particular, the privacy backlight 110 is located between the broad-angle backlight 140 and the array of light valves 120, the privacy backlight 110 being configured to transmit the broad-angle emitted light 102c through a thickness of the privacy backlight 110, as illustrated in FIG. 3B. Further, the light valve array is configured to modulate the broad-angle emitted light 102c to provide a shared image 100c. According to various embodiments, the broad-angle emitted light 102c has an angular range that includes the first view zone I and the second view zone II. The shared image 100c is visible in both the first and second view zones I, II, and may be or represent a two-dimensional (2D) image, in some embodiments.

In some embodiments, the broad-angle backlight 140 may comprise a light source 142 that when activated enables the broad-angle backlight 140 to provide the broad-angle emitted light 102c. Cross-hatching of the light source 142 in FIG. 3B illustrates activation of the broad-angle backlight 140. According to various embodiments, the broad-angle backlight 140 is activated when the privacy backlight 110 is inactivated. Alternatively, the broad-angle backlight 140 may be inactivated when the privacy backlight 110 is activated. FIG. 3A illustrates activation of the privacy backlight 110 using cross-hatching of the light source 116. FIG. 3A also illustrated activation of the static display layer 130 using cross-hatching of the light source 134.

Figure 5A:
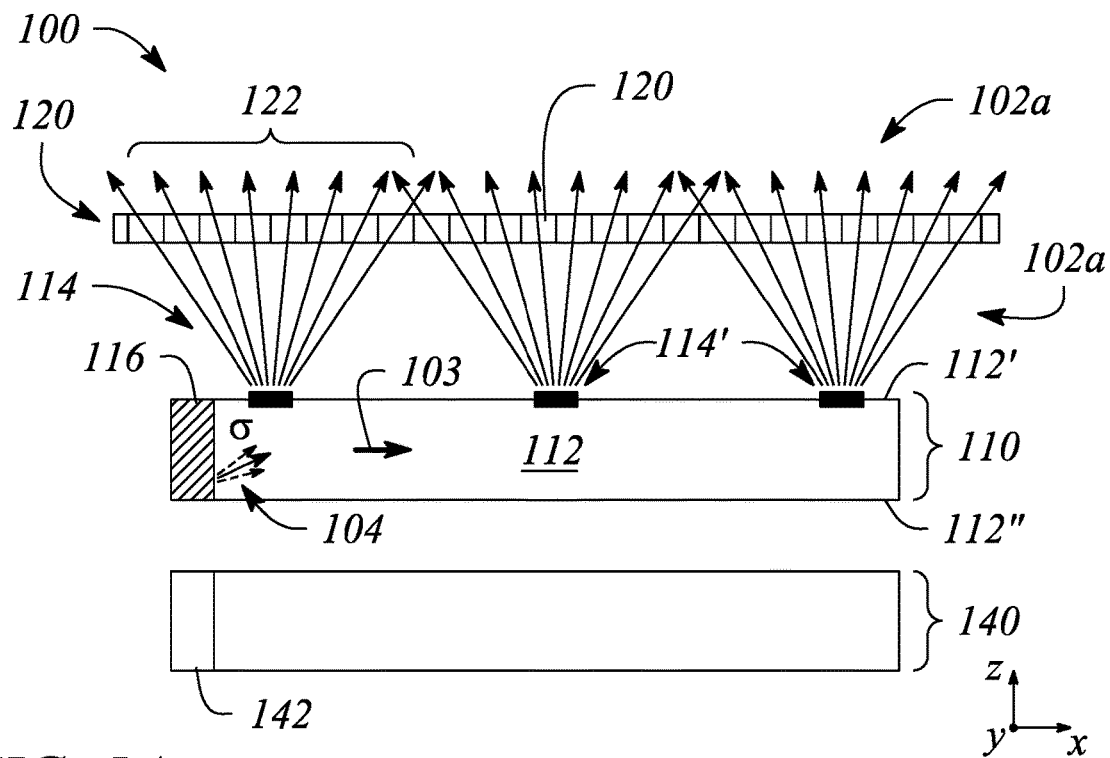
FIG. 5A illustrates a cross-sectional view of a privacy backlight in an example, according to an embodiment consistent with the principles described herein.
Figure 5B:
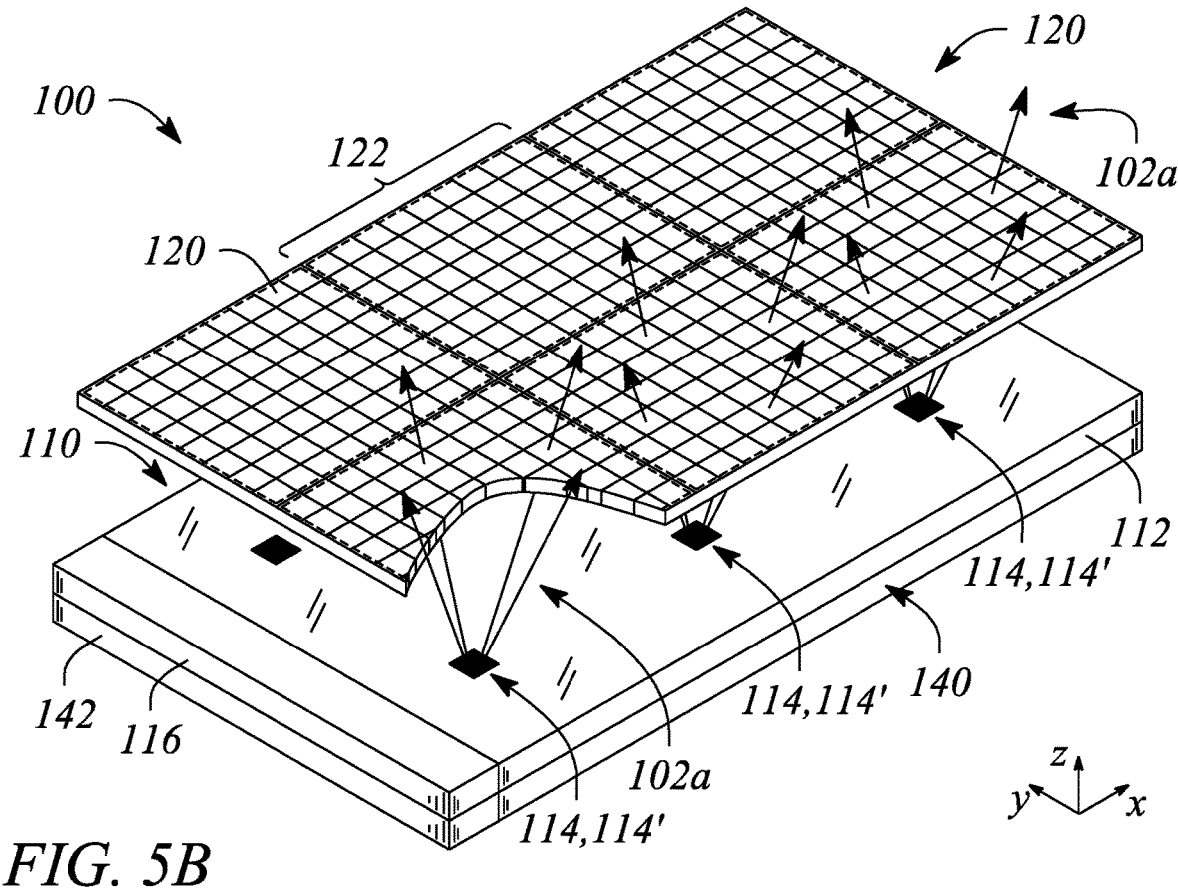
FIG. 5B illustrates a perspective view of a privacy backlight in an example, according to an embodiment consistent with the principles described herein.

As mentioned above, the directional scattering feature 114 of the privacy backlight 110 may comprise an array of multibeam elements and the private image 100a may be a multiview image. FIG. 5A illustrates a cross-sectional view of a privacy backlight 110 in an example, according to an embodiment consistent with the principles described herein. FIG. 5B illustrates a perspective view of a privacy backlight 110 in an example, according to an embodiment consistent with the principles described herein. In particular, the privacy backlight 110 illustrated in FIGS. 5A-5B comprises the light guide 112 and the directional scattering feature 114 comprising an array of multibeam elements 114'. FIGS. 5A-5B also illustrate the array of light valves 120 of the static-image augmented privacy display 100 and the broad-angle backlight 140. The static display layer 130 of the static-image augmented privacy display 100 is omitted in FIGS. 5A-5B for ease of illustration and not by way of limitation.

As illustrated, each multibeam elements 114' of the multibeam element array scatter out a portion of the guided light 104 from the light guide 112 of the privacy backlight 110 to provide the directional emitted light 102a comprising directional light beams. According to various embodiments, the directional light beams of the directional emitted light 102a (illustrated as diverging arrows in FIGS. 5A-5B) have different directions corresponding to the different view directions of a multiview image within the first view zone I. The different directional light beams provided by the privacy backlight 110 pass through and are modulated by different light valves 120 of the array of light valves 120 to provide the multiview image. As illustrated in FIG. 5A, the directional light beams also pass through the static display layer 130 after being modulated by the light valve array and prior to being visible as the multiview image in the first view zone I.

As illustrated in FIGS. 5A-5B, the array of light valves 120 may be divided into a plurality of multiview pixels 122, each multiview pixel 122 comprising a subset of light valves 120 and corresponding to a different one of the multibeam elements 114' of the multibeam element array. In particular, there may be a one-to-one correspondence between multiview pixels 122 and multibeam elements 114', in some embodiments. In some embodiments, a location of a multibeam element 114' may be aligned with a center of the multiview pixel 122, e.g., as illustrated. In other embodiments, the multibeam element 114' may be shifted or offset from a center of the multiview pixel 122 to tilt the directional emitted light 102a comprising the directional light beams. Tilting of the directional emitted light 102a may be employed to selectively adjust a direction of the first view zone I, for example.

According to some embodiments, a size of the multibeam element 114' is between twenty-five percent and two hundred percent of a size of a light valve 120 of the light valve array. Herein, the 'size' may be defined in any of a variety of manners to include, but not be limited to, a length, a width or an area. For example, the size of a light valve 120 may be a length thereof and the comparable size of the multibeam element 114' may also be a length of the multibeam element 114'. In another example, size may refer to an area such that an area of the multibeam element 114' may be comparable to an area of the light valve 120. In other examples, the multibeam element size is greater than about fifty percent (50%) of the light valve size, or about sixty percent (60%) of the light valve size, or about seventy percent (70%) of the light valve size, or greater than about eighty percent (80%) of the light valve size, or greater than about ninety percent (90%) of the light valve size, and the multibeam element 114' is less than about one hundred eighty percent (180%) of the light valve size, or less than about one hundred sixty percent (160%) of the light valve size, or less than about one hundred forty percent (140%) of the light valve size, or less than about one hundred twenty percent (120%) of the light valve size. According to some embodiments, the comparable sizes of the multibeam element 114' and the light valve 120 may be chosen to reduce, or in some examples to minimize, dark zones between views of the multiview image, while at the same time reducing, or in some examples minimizing, an overlap between views of the multiview image.

According to various embodiments, multibeam elements 114' of the multibeam element array may comprise one or more of a diffraction grating configured to diffractively scatter out the portion of the guided light, a micro-reflective multibeam element configured to reflectively scatter out the portion of the guided light, and a micro-refractive multibeam element configured to refractively scatter out the portion of the guided light. In some embodiments, the diffraction grating may comprise a plurality sub-gratings configured to cooperatively scatter out the portion of the guided light as the emitted light comprising the directional light beams. In some embodiments, the micro-reflective multibeam element may comprise a plurality of reflective sub-elements configured to cooperatively scatter out the portion of the guided light as the emitted light comprising the directional light beams.

Further still, in some embodiments, multibeam elements 114' of the multibeam element array may comprise a micro-slit multibeam element having a sloped reflective sidewall with a slope angle tilted away from a propagation direction of the guided light 104 within the light guide 112. The sloped reflective sidewall is configured to scatter out the portion of the guided light 104 as the directional emitted light 102a comprising the directional light beams, according to various embodiments. In some of these embodiments, the micro-slit multibeam elements may comprise a plurality of micro-slit sub-elements within an extent of the micro-slit multibeam element, micro-slit sub-elements of the micro-slit sub-element plurality being configured to cooperatively scatter out the portion of the guided light as the emitted light comprising the directional light beams.

According to some embodiments, the privacy backlight 110 of the static-image augmented privacy display 100 may comprise a light source 116 optically coupled to an input edge of the light guide 112, e.g., as illustrated in FIGS. 3 and 5A-5B. The light source 116 is configured to provide light to be guided within the light guide 112 as the guided light 104. In some embodiments, light source 116 may be configured to provide light to be guided as the guided light 104 having one or both of the non-zero propagation angle and the predetermined collimation factor σ, as described above.

In accordance with some embodiments of the principles described herein, a mode-switchable privacy display system is provided. The mode-switchable privacy display system is configured to switch between a privacy mode and a shared mode. During the privacy mode, a private image may be provided to a first view zone and a static image may be provided to a second view zone. The mode-switchable display is further configured to provide a shared image to both the first view zone and a second view zone during the shared mode. Further, one or both of the privacy image and the static image may comprise a multiview image to facilitate display of three-dimensional (3D) content, according to some embodiments.

According to some embodiments, the first view zone and the second view zone are mutually exclusive of one another. As a result, the private image is configured to be visible to a user of the mode-switchable privacy display system exclusively in the first view zone. Similarly, the static image is configured to be visible to the user exclusively in the second view zone, in these embodiments.

According to various embodiments, the mode-switchable privacy display system may be switched between the privacy mode and the shared mode during operation. In the shared mode, the shared image may be visible to the user in both the first and second view zones. Further, the privacy mode and the shared mode are mutually exclusive operational modes such that the mode-switchable privacy display system is switched during operation to be either in the privacy mode or in the shared mode, according to various embodiments.

The mode-switchable privacy display system may be employed as a display system in a variety of applications including, but not limited to, in a smartphone, a tablet computer, or laptop computer, as well as an information/entertainment display system in a vehicle such as an automobile or airplane. For example, when used in an automobile, the first view zone may direct the private image toward a passenger and the second view zone may direct the static image toward a driver of the automobile during the privacy mode. The private image may be used to provide information and entertainment content to the passenger without distracting the driver. The static image may be logo or similar static image, for example. Alternatively during the shared mode, the shared image may be provided to both the driver and the passenger, according to some embodiments. As such, the shared image may contain information or other content that may be useful to both the passenger and the driver, without being unduly distracting to the driver, e.g., a map display, a music system user interface, a user interface to control cabin environment, or the like.

Figure 6:
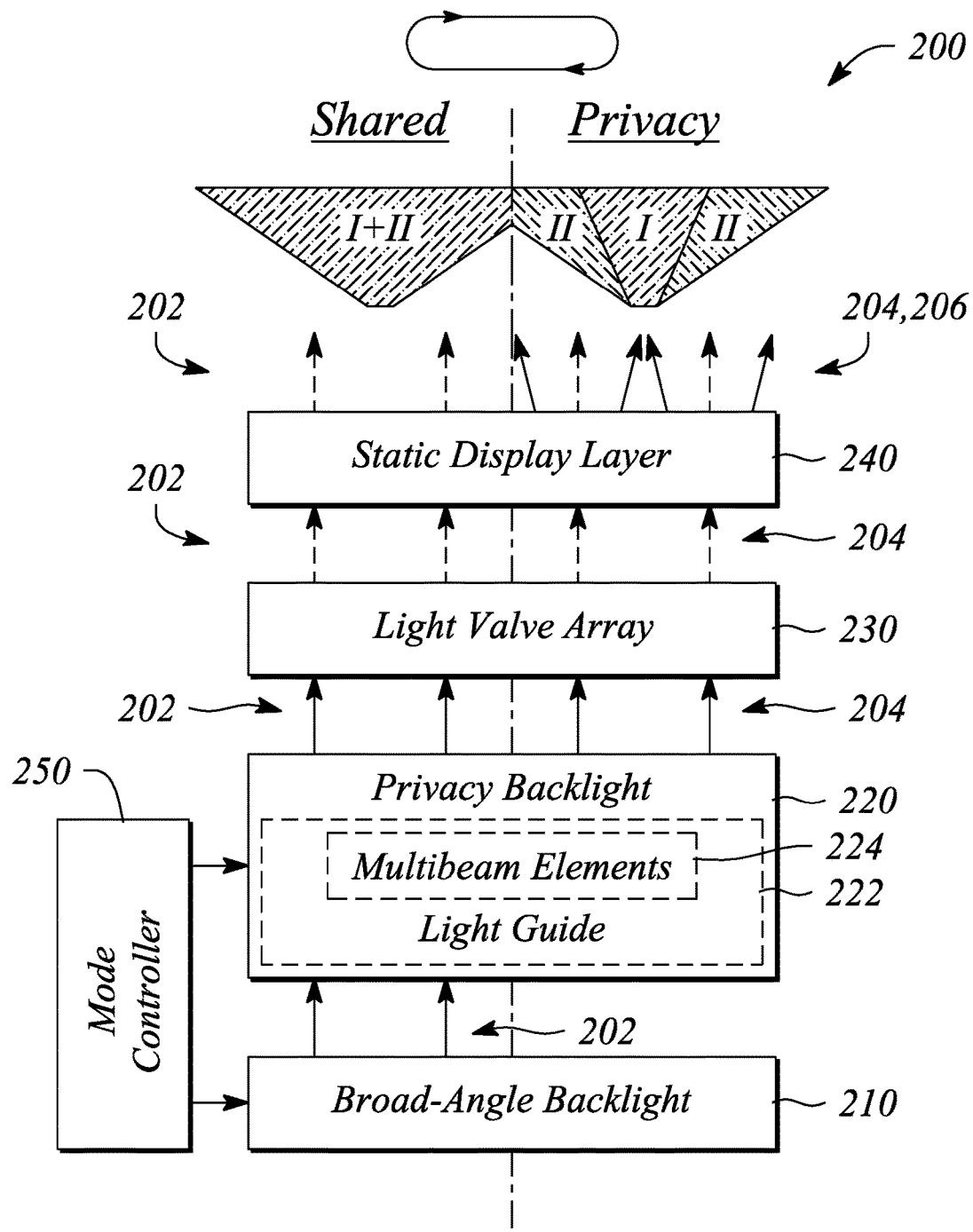
FIG. 6 illustrates a block diagram of a mode-switchable privacy display system in an example, according to an embodiment consistent with the principles described herein.

FIG. 6 illustrates a block diagram of a mode-switchable privacy display system 200 in an example, according to an embodiment consistent with the principles described herein. The mode-switchable privacy display system 200 illustrated in FIG. 6 is configured to provide both the private image to the first view zone I and the static image to the second view zone II during a private mode. The mode-switchable privacy display system 200 of FIG. 6 is further configured to provide the shared image to both the first and second view zones I, II during the shared mode.

As illustrated, the mode-switchable privacy display system 200 comprises a broad-angle backlight 210. The broad-angle backlight 210 is configured to provide broad-angle emitted light 202 to both a first view zone I and a second view zone II during a shared mode. In some embodiments, the broad-angle backlight 210 may be substantially similar to the broad-angle backlight 140 described above with respect to the static-image augmented privacy display 100.

The mode-switchable privacy display system 200 illustrated in FIG. 6 further comprises an privacy backlight 220. The privacy backlight 220 is configured to provide directional emitted light 204 exclusively to the first view zone I during the privacy mode. In some embodiments, the privacy backlight 220 may be substantially similar to the privacy backlight 110 of the above-described static-image augmented privacy display 100.

For example, the privacy backlight 220 may comprise a light guide 222 configured to guide light as guided light, as illustrated in FIG. 6 by way of example and not limitation. The light guide 222 may be substantially similar to the light guide 112 of the privacy backlight 110, described above. For example, the light guide 222 may comprise a sheet or planar layer of optically transparent dielectric material configured to guide light according to total internal reflection.

In some embodiments, the privacy backlight 220 may comprise a directional scatter feature that is substantially similar to the directional scattering feature 114, described above. In particular, as is further illustrated in FIG. 6, the privacy backlight 220 may comprise array of multibeam elements 224 spaced apart from one another across the light guide 222 serving as the directional scattering feature. In these embodiments, each multibeam element 224 of the multibeam element array may be configured to scatter out a portion of the guided light as the directional emitted light 204 comprising directional light beams. According to various embodiments, the directional light beams have directions corresponding to view directions of a multiview image. In some embodiments, the multibeam elements 224 may be substantially similar to the multibeam elements 114' described above with respect to the privacy backlight 110.

According to various embodiments, the mode-switchable privacy display system 200 further comprises an array of light valves 230, as illustrated in FIG. 6. The array of light valves 230 is configured to modulate the directional emitted light 204 from the privacy backlight 220 to provide the private image in the first view zone I, during the privacy mode. The array of light valves 230 is further configured to modulate the broad-angle emitted light 202 to provide the shared image in both the first view zone I and the second view zone II, during the shared mode. In some embodiments, the array of light valves may be substantially similar to the array of light valves 120 of the above-described static-image augmented privacy display 100. In FIG. 6, dashed lines are used to indicate modulation of the broad-angle emitted light 202 and the directional emitted light 204 by the array of light valves 230.

As illustrated in FIG. 6, the mode-switchable privacy display system 200 further comprises a static display layer 240. The static display layer 240 is disposed adjacent to and separated from an emission surface of the light valve array. A gap between the static display layer 240 may be filled with a low-index material such as, but not limited to, air or a low-index adhesive, in various embodiments. The static display layer 240 is configured to provide the static image in the second view zone II during the privacy mode. In particular, the static display layer 240 is configured to emit static directional emitted light 206 representing pixels of the static image. The static display layer 240 may be substantially similar to the static display layer 130 described above with respect to the static-image augmented privacy display 100.

For example, the static display layer 130 may comprise light guide configured to guide light as guided light comprising a plurality of guided light beams having different radial directions from one another, in some embodiments. Further, the static display layer 130 may comprise a light source and a plurality of directional scattering elements. The light source may be optically coupled to an edge of the light guide and configured to provide the light to light guide to be guided as the guided light. The plurality of directional scattering elements may be configured to scatter the guided light out of the light guide as the static directional emitted light 206 representing the static image within the second view zone II. Further, characteristics of individual directional scattering elements of the directional scattering element plurality may encode the pixels of the static image, according to various embodiments.

In FIG. 6, a solid line is used to depict the static directional emitted light 206 from the static display layer 240 to emphasize that the static directional emitted light 206 is not modulated by the light valve array. FIG. 6 also illustrates both the broad-angle emitted light 202 during the shared mode and the directional emitted light 204 from the privacy backlight 220 during the privacy mode passing or being transmitted through the static display layer 240 after being modulated by the light valve array.

In some embodiments, the plurality of directional scattering elements may be configured to scatter out the guided light as directional light beams to provide the static image as a static multiview image. As such, the static display layer may represent a static multiview display. In these embodiments, each directional scattering element of the directional scattering element plurality is configured to provide from a portion of a guided light beam of the guided light beam plurality a directional light beam having an intensity and a principal angular direction corresponding to an intensity and a view direction of a view pixel of the static multiview image.

In some embodiments (as illustrated in FIG. 6), the mode-switchable privacy display system 200 further comprises a mode controller 250. The mode controller 250 is configured to selectively activate either the broad-angle backlight 210 to provide the broad-angle emitted light during the shared mode or the privacy backlight 220 to provide the directional emitted light along with the static display layer 240 to provide the static image during the privacy mode. The mode controller 250 may also coordinate control of the light valve array. In various embodiments, the mode controller 250 may be implemented one or both of as hardware comprising circuitry (e.g., an ASIC) and modules comprising software or firmware that are executed by a processor or similar circuitry to various operational characteristics of the mode controller 250.

Figure 7A:
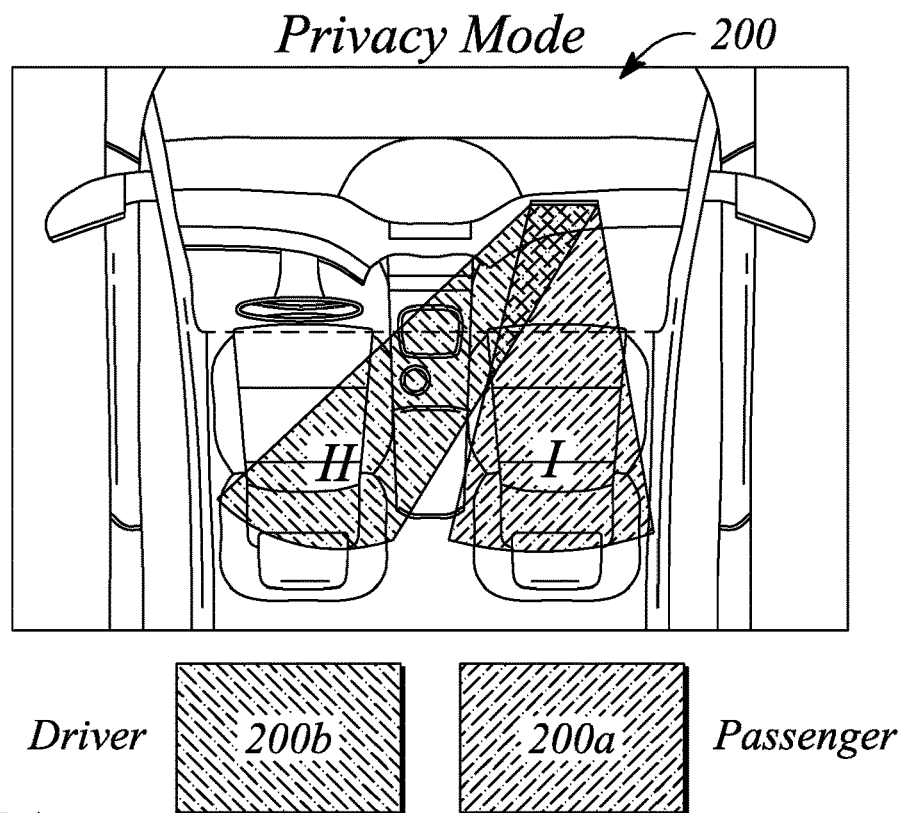
FIG. 7A illustrates a top view of a mode-switchable privacy display system in an example, according to an embodiment consistent with the principles described herein.
Figure 7B:
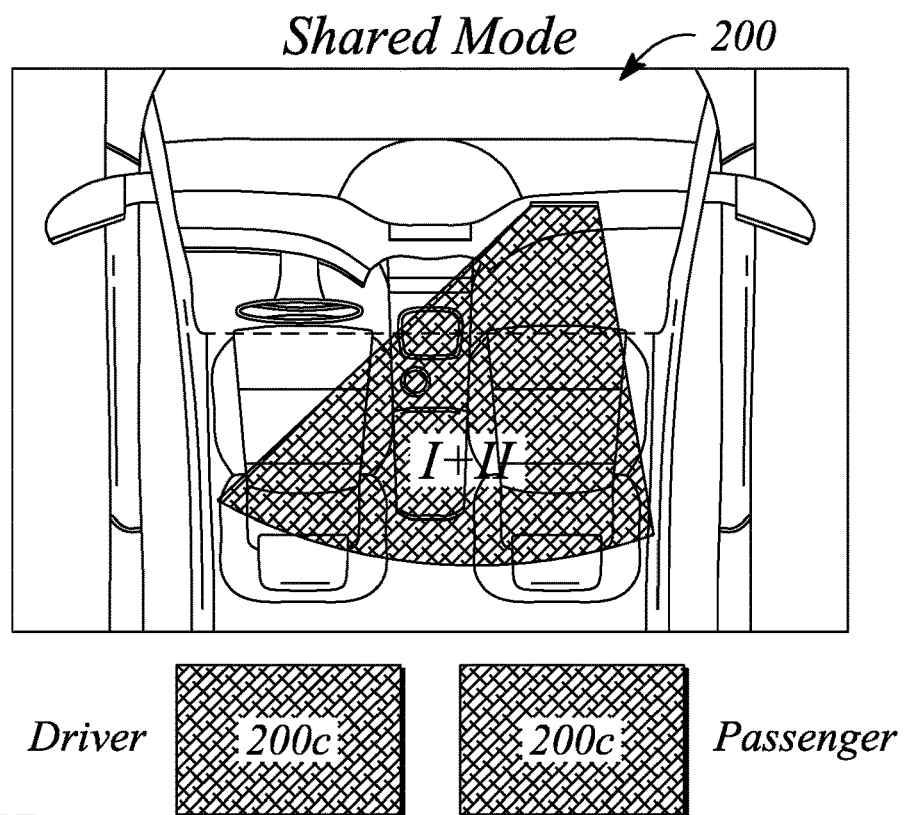
FIG. 7B illustrates a top view of a mode-switchable privacy display system in another example, according to an embodiment consistent with the principles described herein.

FIG. 7A illustrates a top view of a mode-switchable privacy display system 200 in an example, according to an embodiment consistent with the principles described herein. FIG. 7B illustrates a top view of a mode-switchable privacy display system 200 in another example, according to an embodiment consistent with the principles described herein. As illustrated in FIGS. 7A and 7B, the mode-switchable privacy display system 200 is installed in an automobile. During the private mode, the mode-switchable privacy display system 200 is configured to provide a private image 200a to passenger in a first view zone I and a static image to a driver in a second view zone II, as illustrated in FIG. 7A. Further, the mode-switchable privacy display system 200 is configured to provide a shared image 200c to both the passenger in the first view zone I and the driver in the second view zone II, as illustrated in FIG. 7B.

Figure 8:
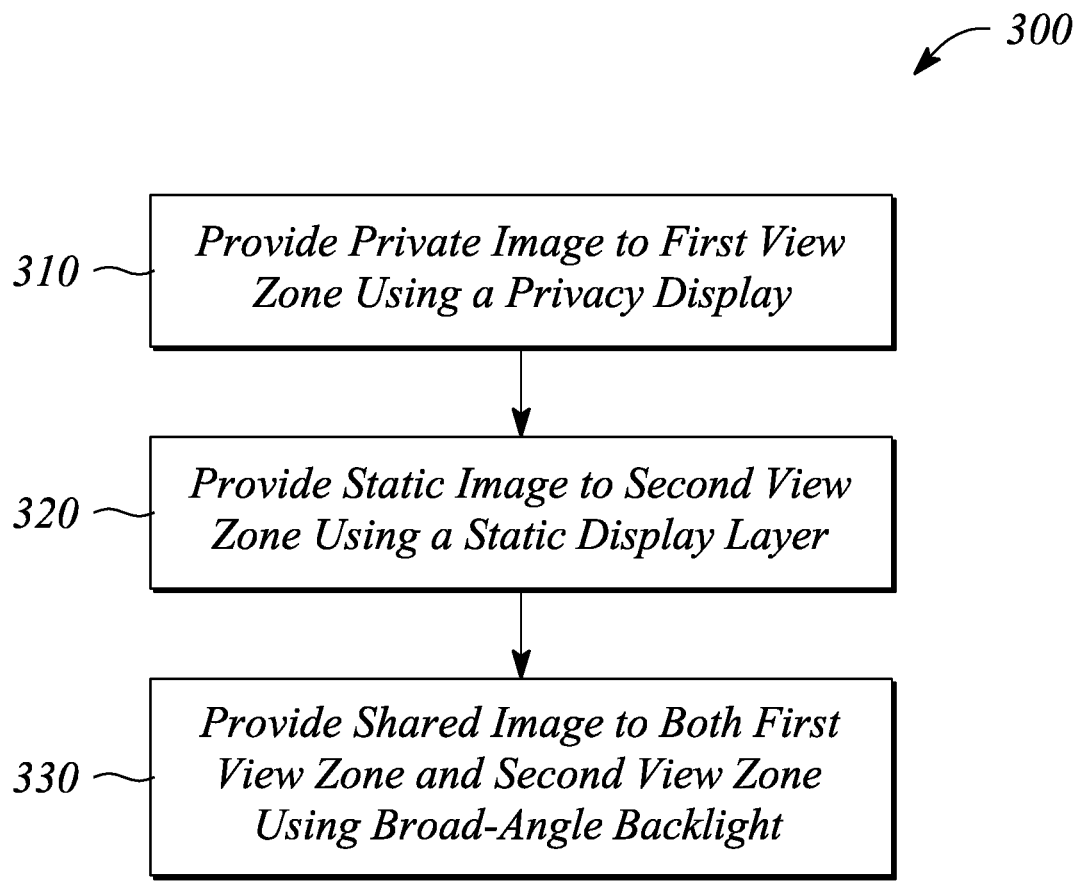
FIG. 8 illustrates a flow chart of a method of static-image augmented privacy display operation in an example, according to an embodiment consistent with the principles described herein.

In accordance with other embodiments of the principles described herein, a method of static-image augmented privacy display operation is provided. FIG. 8 illustrates a flow chart of a method 300 of static-image augmented privacy display operation in an example, according to an embodiment consistent with the principles described herein. The method 300 of static-image augmented privacy display operation may be used to provide a private image to a first view zone and a stat image to a second view zone, according to various embodiments. According to various embodiments, the first view zone and the second view zones are mutually exclusive to one another. Further, the private image may be visible exclusively in the first view zone and the static image may be visible exclusively in the second view zone, according to various embodiments.

As illustrated in FIG. 8, the method 300 of static-image augmented privacy display operation comprises providing 310 the private image to the first view zone using a privacy display. In some embodiments, the privacy display may be substantially similar to a combination of the privacy backlight 110 and the array of light valves 120, described above with respect to the static-image augmented privacy display 100.

In particular, in some embodiments, providing 310 the private image to the first view zone using the privacy display comprises emitting directional emitted light having an angular extent corresponding to the first view zone using a privacy backlight. The privacy backlight may comprise a light guide configured to guide light and a directional scattering feature configured to scatter light out of the light guide as directional emitted light, according to various embodiments. Providing 310 the private image to the first view zone using the privacy display further comprises modulating the directional emitted light using an array of light valves to produce the private image.

In some embodiments, the directional scattering feature may comprise an array of multibeam elements spaced apart from one another across the light guide. The array of multibeam elements are configured to scatter out a portion of the guided light as the emitted light comprising directional light beams having directions corresponding to view directions of a multiview image within the first view zone. In these embodiments, the private image is the multiview image and the privacy display is a multiview display. According to some embodiments, the multibeam elements may be substantially similar to the multibeam elements 114', as described above with respect to the privacy backlight 110.

The method 300 of static-image augmented privacy display operation illustrated in FIG. 8 further comprises providing 320 a static image to a second view zone using a static display layer. The static display layer is disposed adjacent to and separated from an emission surface of the privacy display. Further, the static display layer is transparent to light representing the private image, in various embodiments. In some embodiments, the static display layer may be substantially similar to the static display layer 130 described above with respect to the static-image augmented privacy display 100. For example, in some embodiments, providing 320 the static image using a static display layer may comprise guiding light in a light guide of the static display layer as guided light and scattering the guided light out of the light guide as a plurality of directional light beams (i.e., static directional emitted light) using a plurality of directional scattering elements optically coupled to the light guide. In these embodiments, an intensity and a principal angular direction of the directional light beams or equivalent of the static directional light comprising the directional light beams represents view pixels of the static image. In addition, the static image may be a multiview image, in some embodiments. Further, the first and the second view zones may be mutually exclusive to one another, according to some embodiments.

In some embodiments (not illustrated in FIG. 8), the method 300 of static-image augmented privacy display operation further comprises providing 330 a shared image to both the first view zone and the second view zone using a broad-angle backlight. In particular, providing 330 a shared image comprises providing broad-angle emitted light using the broad-angle backlight and modulating the broad-angle emitted light using the array of light valves of the privacy display to provide a shared image. In various embodiments, the shared image is visible in both of the first view zone and the second view zone. The broad-angle backlight may be substantially similar to the broad-angle backlight 140 of the above-described static-image augmented privacy display 100, in some embodiments. In some embodiments, the shared image is provided during a shared mode, while the private image and the static image are both provided during a privacy mode.

Thus, there have been described examples and embodiments of a static-image augmented privacy display, a mode-switchable privacy display system, and a method of static-image augmented privacy display operation that provide a private image to a first view zone and a static image to a second view zone. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A static-image augmented privacy display comprising:
   a privacy backlight configured to provide directional emitted light to a first view zone;
   a light valve array configured to modulate the directional emitted light to provide a private image within the first view zone; and
   a static display layer configured to provide a static image in a second view zone as static directional emitted light that exits the static-image augmented privacy display without passing through the light valve array, the static display layer being adjacent to and separated from an emission surface of the light valve array and transparent to light representing the private image,
   wherein the first and the second view zones are mutually exclusive to one another, the private image being configured to be visible exclusively in the first view zone and the static image being configured to be visible exclusively in the second view zone.

2. The static-image augmented privacy display of claim 1, wherein the privacy backlight comprises:
   a light guide configured to guide light as guided light; and
   a directional scattering feature configured to scatter the guided light out of the light guide as the directional emitted light having an angular extent corresponding to the first view zone.

3. The static-image augmented privacy display of claim 2, wherein the directional scattering feature comprises an array of multibeam elements spaced apart from one another across the light guide, multibeam elements of the multibeam element array being one or both of adjacent to a guiding surface and between opposing guiding surfaces of the light guide, and wherein each multibeam element of the multibeam element array is configured to scatter out a portion of the guided light as the directional emitted light comprising directional light beams having directions corresponding to different view directions of a multiview image within the first view zone, the private image being the multiview image.

4. The static-image augmented privacy display of claim 3, wherein the multi beam elements comprise one or more of a diffraction grating configured to diffractively scatter out the portion of the guided light, a micro-reflective multibeam element configured to reflectively scatter out the portion of the guided light, and a micro-refractive multibeam element configured to refractively scatter out the portion of the guided light.

5. The static-image augmented privacy display of claim 4, wherein one or both of:
the diffraction grating comprises a plurality sub-gratings configured to cooperatively scatter out the portion of the guided light as the directional emitted light comprising the directional light beams; and
the micro-reflective multi beam element comprises a plurality of reflective sub-elements configured to cooperatively scatter out the portion of the guided light as the directional emitted light comprising the directional light beams.

6. The static-image augmented privacy display of claim 3, wherein the multibeam elements comprise a micro-slit multibeam element having a sloped reflective sidewall with a slope angle tilted away from a propagation direction of the guided light within the light guide, the sloped reflective sidewall being configured to scatter out the portion of the guided light as the directional emitted light comprising the directional light beams.

7. The static-image augmented privacy display of claim 6, wherein the micro-slit multi beam elements comprise a plurality of micro-slit sub-elements within an extent of the micro-slit multibeam element, micro-slit sub-elements of the micro-slit sub-element plurality being configured to cooperatively scatter out the portion of the guided light as the directional emitted light comprising the directional light beams.

8. The static-image augmented privacy display of claim 3, wherein a size of the multibeam element is between twenty-five percent and two hundred percent of a size of a light valve of the light valve array.

9. The static-image augmented privacy display of claim 2, the privacy backlight further comprising a light source optically coupled to an input edge of the light guide and configured to provide light to be guided within the light guide as the guided light, wherein the guided light within the light guide has a non-zero propagation angle and a predetermined collimation factor.

10. The static-image augmented privacy display of claim 1, wherein the static display layer comprises:
a light guide configured to guide light from a light source as guided light; and
a plurality of directional scattering elements configured to scatter the guided light out of the light guide to provide the static image within the second view zone.

11. The static-image augmented privacy display of claim 10, wherein the guided light comprises a plurality of guided light beams having different radial directions from one another, the plurality of directional scattering elements being configured to scatter out the guided light as directional light beams to provide the static image as a static multi view image, and wherein each directional scattering element of the directional scattering element plurality is configured to scatter out a portion of a guided light beam of the guided light as a directional light beam having an intensity and a principal angular direction corresponding to an intensity and a view direction of a view pixel of the static multiview image.

12. The static-image augmented privacy display of claim 11, wherein a directional scattering element of the directional scattering element plurality comprises a diffraction grating, a grating characteristic of the diffraction grating being configured to determine the intensity and the principal angular direction of the directional light beam scattered out by the directional scattering element.

13. The static-image augmented privacy display of claim 12, wherein the grating characteristic comprises one or more of a grating depth, a grating pitch, and a grating orientation, the grating depth being configured to determine the intensity of the directional light beam provided by the diffraction grating and one or both of the grating pitch and the grating orientation being configured to determine the principal angular direction of the directional light beam provided by the diffraction grating.

14. The static-image augmented privacy display of claim 1, further comprising a broad-angle backlight disposed adjacent to the privacy backlight configured to provide broad-angle emitted light, the privacy backlight being configured to transmit the broad-angle emitted light through a thickness of the privacy backlight and the light valve array being configured to modulate the broad-angle emitted light to provide a shared image,
wherein the broad-angle emitted light has an angular range that includes the first view zone and the second view zone, the shared image being visible in both the first and second view zones.

15. A mode-switchable privacy display system comprising:
a broad-angle backlight configured to provide broad-angle emitted light to both a first view zone and a second view zone during a shared mode;
a privacy backlight configured to provide directional emitted light exclusively to the first view zone during a privacy mode;
a light valve array configured to modulate the directional emitted light to provide a private image in the first view zone and to modulate the broad-angle emitted light to provide a shared image in both the first and second view zones; and
a static display layer disposed adjacent to and separated from an emission surface of the light valve array and configured to provide a static image in the second view zone during the privacy mode as static directional emitted light that exits the mode-switchable privacy display system without passing through the light valve array.

16. The mode-switchable privacy display system of claim 15, wherein the first view zone and the second view zone are mutually exclusive of one another, the private image being configured to be exclusively visible in the first view zone and the static image being configured to be visible exclusively in the second view zone.

17. The mode-switchable privacy display system of claim 15, wherein the privacy backlight comprises:
a light guide configured to guide light as guided light; and
an array of multi beam elements spaced apart from one another across the light guide, each multibeam element of the multibeam element array being configured to scatter out a portion of the guided light as the directional emitted light comprising directional light beams having directions corresponding to view directions of a multiview image,
wherein the private image is the multiview image and is visible exclusively within the first view zone.

18. The mode-switchable privacy display system of claim 15, wherein the static display layer comprises:
a light guide configured to guide light as guided light comprising a plurality of guided light beams having different radial directions from one another;

a light source optically coupled to an edge of the light guide and configured to provide the light to the light guide to be guided as the guided light; and a plurality of directional scattering elements configured to scatter the guided light out of the light guide as the static image within the second view zone, characteristics of individual directional scattering elements of the directional scattering element plurality encoding pixels of the static image.

19. The mode-switchable privacy display system of claim 18, wherein the plurality of directional scattering elements is configured to scatter out the guided light as directional light beams to provide the static image as a static multiview image and the static display layer represents a static multiview display, each directional scattering element of the directional scattering element plurality being configured to provide from a portion of a guided light beam of the guided light beam plurality a directional light beam having an intensity and a principal angular direction corresponding to an intensity and a view direction of a view pixel of the static multiview image.

20. The mode-switchable privacy display system of claim 15, further comprising a mode controller configured to selectively either activate the broad-angle backlight to provide the broad-angle emitted light during the shared mode or activate the privacy backlight to provide the directional emitted light and the static display layer to provide the static image during the privacy mode.

21. A method of static-image augmented privacy display operation, the method comprising:

providing a private image to a first view zone using a privacy display comprising a privacy backlight and a light valve array; and providing, using a static display layer adjacent to and separated from an emission surface of the light valve array, a static image to a second view zone as static directional emitted light that exits the privacy display without passing through the light valve array, the static display layer being transparent to light representing the private image, wherein the first view zone and the second view zone are mutually exclusive to one another, the private image being visible exclusively in the first view zone and the static image being visible exclusively in the second view zone.

22. The method of static-image augmented privacy display operation of claim 21, wherein providing a private image to a first view zone using a privacy display comprises:

emitting directional emitted light having an angular extent corresponding to the first view zone using a privacy backlight comprising a light guide configured to guide light as guided light and a directional scattering feature configured to scatter the guided light out of the light guide as the directional emitted light; and modulating the directional emitted light using the light valve array to produce the private image.

23. The method of static-image augmented privacy display operation of claim 22, wherein the directional scattering feature comprises an array of multi beam elements spaced apart from one another across the light guide and configured to scatter out a portion of the guided light as the directional emitted light comprising directional light beams having directions corresponding to view directions of a multi view image within the first view zone, the private image being the multiview image and the privacy display being a multiview display.

24. The method of static-image augmented privacy display operation of claim 22, further comprising:

providing broad-angle emitted light using a broad-angle backlight; and modulating the broad-angle emitted light using the light valve array to provide a shared image, the shared image being visible in both of the first view zone and the second view zone, wherein the shared image is provided during a shared mode, the private image and the static image being provided during a privacy mode.

25. The method of static-image augmented privacy display operation of claim 21, wherein providing the static image using a static display layer comprises:

guiding light in a light guide of the static display layer as guided light; and scattering the guided light out of the light guide as a plurality of directional light beams using a plurality of directional scattering elements optically coupled to the light guide, an intensity and a principal angular direction of the directional light beams representing view pixels of the static image.

* * * * *

UNITED STATES PATENT AND TRADEMARK OFFICE
CERTIFICATE OF CORRECTION

| | |
|---|---|
| PATENT NO. | : 12,313,872 B2 |
| APPLICATION NO. | : 17/895944 |
| DATED | : May 27, 2025 |
| INVENTOR(S) | : Fattal et al. |

It is certified that error appears in the above-identified patent and that said Letters Patent is hereby corrected as shown below:

In the Claims

In Column 22, Line 64, in Claim 4, delete "multi beam" and insert --multibeam-- therefor In Column 23, Line 10, in Claim 5, delete "multi beam" and insert --multibeam-- therefor In Column 23, Line 25, in Claim 7, delete "multi beam" and insert --multibeam-- therefor In Column 23, Line 55, in Claim 11, delete "multi view" and insert --multiview-- therefor In Column 24, Line 54, in Claim 17, delete "multi beam" and insert --multibeam-- therefor In Column 26, Line 14, in Claim 23, delete "multi beam" and insert --multibeam-- therefor In Column 26, Line 19, in Claim 23, delete "multi view" and insert --multiview-- therefor Signed and Sealed this
Fifth Day of August, 2025

Coke Morgan Stewart
*Acting Director of the United States Patent and Trademark Office*